United States Patent Office 3,661,888
Patented May 9, 1972

3,661,888
WATER INSOLUBLE DISAZO DYESTUFFS RESULTING FROM COUPLING N,β-ACETOXYETHYL - N,β-CYANOETHYLANILINE AND DIAZOTIZED 4 - AMINO - 2' - OR 4' - NITRO-AZOBENZENE
John Sagal, Jr., Rochester, N.Y., assignor to Martin Marietta Corporation
No Drawing. Filed Feb. 12, 1970, Ser. No. 11,025
Int. Cl. C09b 31/04; D06p 1/06
U.S. Cl. 260—187                           3 Claims

ABSTRACT OF THE DISCLOSURE

A water insoluble disazo dye of the formula $$O_2N-\langle\phi\rangle-N=N-\langle o\rangle-N=N-\langle o\rangle-N\begin{matrix}CH_2-CH_2-CN\\CH_2-CH_2-O-\underset{\underset{O}{\|}}{C}-CH_3\end{matrix}$$

is prepared by coupling, under acid conditions, equimolar amounts of N,β1acetoxyethyl-N,β-cyanoethylaniline and a diazotized amine of the formula $$O_2N-\langle\phi\rangle-N=N-\langle o\rangle-NH_2$$

wherein each $NO_2$ group is para or meta to the azo group attached to the same phenylene ring as the $NO_2$ group in question. The dyes may be used as disperse dyes for dyeing polyethylene terephthalate textile fibers to red or orange shades by the conventional thermosol dyeing method, to produce dyeings having excellent light, wash and sublimation fastness.

---

The present invention relates to dyestuffs, and more particularly to water insoluble disazo dyestuffs and to the method for making same.

The dyestuffs of the present invention are particularly characterized in having the general formula $$O_2N-\langle\phi\rangle-N=N-\langle o\rangle-N=N-\langle o\rangle-N\begin{matrix}CH_2-CH_2-CN\\CH_2-CH_2-O-\underset{\underset{O}{\|}}{C}-CH_3\end{matrix}\quad(I)$$

wherein the $NO_2$ group is para or meta to the azo group attached to the same phenylene ring as the $NO_2$ group.

Generally speaking, the method of the present invention is a process for making water insoluble disazo dyestuff of the above Formula I comprising the step of coupling, under acid conditions, equimolar amounts of N,β-acetoxyethyl - N,β - cyanoethylaniline and a diazotized amine of the formula $$O_2N-\langle\phi\rangle-N=N-\langle o\rangle-NH_2$$

wherein the $NO_2$ group is para or meta to the azo group attached to the same phenylene ring as the $NO_2$ group.

The dyestuffs of the present invention are useful for dyeing textile fibers, and are particularly suitable for use as disperse dyes for dyeing synthetic linear polyester textile fibers, such as polyethylene terephthalate, preferably by the conventional thermosol dyeing method. The dyestuffs may also be applied to synthetic textile fibers by the conventional carrier dyeing method, using a carrier such as o-phenylphenol.

When the dyes of the present invention are applied to polyethylene terephthalate textile fibers by the thermosol dyeing method, the resulting dyeings have excellent light, wash and sublimation fastness, and the dye builds well from light to heavy shades. The dye of Example 1 below dyes polyethylene terephthalate brick-red, and the dye of Example 2 below dyes polyethylene terephthalate orange.

The following is a more detailed description of the method for making the dyes of the present invention. All parts herein are by weight unless otherwise specified.

$$O_2N-\langle\phi\rangle-N=N-\langle o\rangle-NH_2$$

wherein the $NO_2$ group is located meta or para to the azo group attached to the same phenylene ring as the $NO_2$ group, may be diazotized with $NaNO_2$ and HCl.

The diazotization step may be conducted by grinding 1 part of the amino-nitro-azobenzene selected to a fine powder, grinding the powder to a paste with 2.07 parts 2 N HCl, adding 0.5 part 2 N HCl and 1 part hot water, cooling externally to 20° C. while stirring, adding 4.13 parts ice, 3.1 parts 2 N HCl, then adding 4.13 parts aqueous 7.5% $NaNO_2$ dropwise while maintaining 0°–5° C., stirring 3 hours at 5° C., filtering through a coarse sintered glass funnel and holding at 0°–5° C. until used.

An acetic acid and acetic anhydride solution of N,β-acetoxyethyl-N,β-cyanoethylaniline may be prepared as follows.

N,β-cyanoethyl-N,β-hydroxyethylaniline may be prepared by charging 6.35 parts phenylethanolamine, 2.96 parts acrylonitrile and 0.46 part glacial acetic acid into an autoclave, purging the closed autoclave twice with 25 p.s.i. nitrogen, agitating while heating at 150°–160° C. for 8 hours at about 45 p.s.i. pressure, cooling to 25°–30° C., heating at 50° C. for 1 hour at 20–25 inches mercury vacuum while agitating, cooling to 30° C., and vacuum distilling off unreacted phenylethanolamine while maintaining head temperature of about 165° C. and vacuum of 28.5–28.75 inches mercury; cool to room temperature. The result is 82% N,β-cyanoethyl-N,β-hydroxyethylaniline.

An acetic acid and acetic anhydride solution of N,β-acetoxyethyl-N-β-cyanoethylaniline may be prepared as follows. 1 part 82% N,β-cyanoethyl-N,β-hydroxyethylaniline is added dropwise to 1 part acetic anhydride while maintaining 85°–95° C., the result held 2 hours at 85°–95° C. after addition is complete, and cooled to room temperature.

The coupling reaction may be conducted as follows. Add 1 part of the above acetic acid and acetic anhydride solution of N,β - acetoxyethyl - N,β - cyanoethylaniline (wherein the 1 part is calculated as N,β-acetoxyethyl-N,β-cyanoethylaniline solids) with stirring to 6.5 parts 1:5 acid (1 part propionic acid to 5 parts glacial acetic acid, both by volume), and 4.3 parts 30% aqueous sodium acetate, and then add 0.2 part sodium lignosulfonate. The above solution of diazotized amino-nitro-azobenzene, in equimolar amount to the amount of N,β-acetoxyethyl-N,β-cyanoethylaniline used, calculated as solids, is gradually added to the above N,β-acetoxyethyl-N,β-cyanoethylaniline solution with stirring while maintaining 0°–10° C. Stir at 0°–10° C. until coupling is complete. Coupling is essentially complete in about 3 hours, although it is suggested to stir for 6 hours at 0°–10° C. to insure maximum yield.

The resulting dyestuff may be recovered by warming to room temperature, drowning in a large volume of water containing 0.1–1% sodium lignosulfonate, recovering the dyestuff solids by filtration, and washing the solids with water at tap temperature until free of acids. The dyestuff solids may be worked up from moist press cake or dried at about 45° C.

The following are illustrative example of embodiments of the present invention, in which all parts are by weight unless otherwise specified.

EXAMPLE 1

The dye of the formula

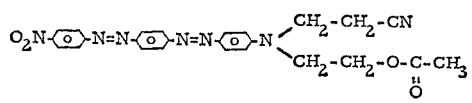

may be prepared as follows.

4.84 gms. (0.02 g.m.w.) 4 - amino - 4' - nitro-azobenzene [Ber. 20, p. 3015 (1877)] is ground to a fine powder in a mortar with pestle. 10 ml. 2 N HCl is added and the mixture ground to a fine Bordeaux colored paste. The paste is transferred to a 250 ml. beaker and the mortar rinsed first with 2.5 ml. 2 N HCl and then rinsed with 5 ml. hot water. The resulting rinse materials are transferred to the beaker. The contents of the beaker are cooled to 20° C. with an external ice bath while stirring. 20 gms. ice is added to the beaker, followed by immediate addition of 15 ml. 2 N HCl. 20 ml. 7.5% aqueous NaNO$_2$ is added dropwise during about 10 minutes while maintaining 0°–5° C. with an external ice bath during the NaNO$_2$ addition. The composition is stirred 3 hours at 5° C., resulting in a clear orange-brown diazo solution, which is filtered through a coarse sintered glass funnel and held at 0°–5° C. until used.

82% assay N,β - cyanoethyl - N,β - hydroxyethylaniline is prepared by charging 635 gms. phenylethanolamine, 296 gms. acrylonitrile and 46.3 gms. glacial acetic acid into an autoclave, purging the closed autoclave twice with 25 p.s.i. nitrogen, inducing 10 inches Hg vacuum, heating to 150°–160° C. with agitation and there holding for 8 hours while pressure reaches about 45 p.s.i. cooling to 25–30° C., inducing 20–25 inches Hg vacuum, holding at 50° C. 1 hour, cooling to 30° C., and vacuum distilling off the unreacted phenylethanolamine at 28.5–28.75 inches Hg while head temperature reaches about 165° C., and cooling the residue of 82% N,β-cyanoethyl - N,β - hydroxyethylaniline to room temperature.

An acetic acid and acetic anhydride solution of N,β-acetoxyethyl - N,β - cyanoethylaniline is prepared by heating 4.6 gms. acetic anhydride to 90° C., adding dropwise 4.6 gms. 82% N,β - cyanoethyl - N,β - hydroxyethylaniline while maintaining 85°–95° C., holding at 85°–95° C. for 2 hours after the addition is complete, and cooling to room temperature. The result contains, by weight, 15.9% acetic acid, 24.8% acetic anhydride, 55.2% N,β - acetoxyethyl - N,β - cyanoethylaniline, and 4.1% impurities, and contains 0.02 g.m.w. N,β-acetoxyethyl - N,β - cyanoethylaniline. It is added, with stirring, to 30 ml. 1:5 acid, 20 ml. 30% aqueous sodium acetate is then added, and 1 gm. sodium lignosulfonate is then added to form the N,β - acetoxyethyl - N,β - cyanoethylaniline coupling composition.

The above diazo solution is added gradually, with stirring, during about 10 minutes to the above N,β-acetoxyethyl - N,β - cyanoethylaniline coupling composition, while maintaining 0°–10° C. during the addition. The composition is stirred 6 hours while maintaining about 5°C. with an external ice bath, although coupling appeared essentially complete after the first 3 hours. The composition is allowed to stand overnight while warming to room temperature. The composition is drowned with 600 ml. water containing 0.5 gm. sodium lignosulfonate, stirred 10 minutes, filtered rapidly on a Buchner funnel, and the cake washed with water until the run-off is neutral. The composition is dried at 45° C., yielding 7.8 gms. of a dark solid dye having a greenish reflectance. The dye colors acetone brownish orange, but dyes polyethylene terephthalate brick red.

EXAMPLE 2

The dye of formula

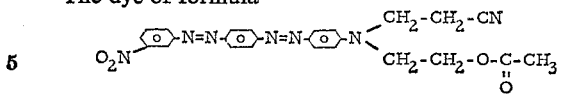

may be prepared as follows.

The dye of Example 2 may be prepared by the same process as the dye of Example 1 above, except that 4-amino - 3' - nitro - azobenzene [Jour. Chem. Soc., vol. 45, p. 112 (1884)] is substituted for the 4-amino-4'-nitroazobenzene used in Example 1. The resulting dye is a brick red solid which dyes polyester terephthalate textile fibers orange.

The following relates to dispersing the dyes of the present invention, applying the same to synthetic linear polyester textile fibers or a blend of cotton/synthetic linear polyester textile fibers, and to properties of the resulting dyeings.

Each of the dyes of the present invention may be dispersed by charging into a ball mill 15 parts of the selected dried dye, 10.2 parts sodium lignosulfonate, 10.2 parts glycerine and 54 parts water. The composition is ball milled until the dye particles are substantially uniform and average 1–2 microns. Enough water is added to bring the final volume to 100 parts, resulting in a 15% aqueous dispersion of the dye.

EXAMPLE A

A dyeing was made on woven blended 65% polyethylene terephthalate/35% cotton textile fabric by mixing a padding liquor containing 151.2 gms. 15% aqueous dispersion of the dye of Example 1, 5.7 gms. sodium alginate migration inhibitor, and enough water to bring to 1 gallon; padding the fabric through the liquor at room temperature; squeezing the fabric with nip rollers to 60% wet pick up based on fabric weight; pre-drying to substantial dryness; fixing the dye by exposing the fabric to dry heat in a thermosol oven at 420° F. for 90 seconds; clearing the dyeing by immersing for 10 minutes at 160° F. in an aqueous bath containing 2 gm./liter 50% aqueous NaOH, 2 gm./liter sodium hydrosulfite, and 1 gm./liter soap; rinsing with water; immersing the dyeing for 1 minute at 140° F. in an aqueous bath containing 2% sodium bichromate and 2% glacial acetic acid; and scouring and drying the fabric. The resulting dyeing was brick red on the polyethylene terephthalate and the cotton was reserved as white.

One portion of the resulting dyeing was tested, and the following numerical ratings are on the Grey Scale in which 5 is optimum. The resulting dyeing had excellent wash fastness to No. 3 AATCC wash test, with pattern 5 and stain 5; excellent light fastness when tested in the carbon arc light fastness tester, with a trace break at 40 hours; excellent gas fastness (oxides of nitrogen), with shade change 5 at 2 cycles; excellent fastness to ozone, with shade change 5 at 2 cycles; and excellent sublimation fastness, with a trace stain commencing at 395° F. and stain 4–5 at 455° F.

The other portion of the dyeing was subjected to permanent press resin finishing in known manner (U.S. Pat. No. 2,974,432) using dimethylol dihydroxy ethylene urea resin, and the dyeing had very slight shade change (shade change 4–5).

EXAMPLE B

Blended cotton/polyethylene terephthalate fabric is dyed, cleared and subjected to permanent press treatment in the same manner as described in Example A above, except that 75.4 gms. of a 15% dispersion of the dye of Example 2 is substituted for the dye used in Example A. The resulting dyeing is orange on the polyethylene terephthalate and the cotton is reserved as white.

The portion which is not subjected to permanent press treatment has very good wash fastness to No. 3 AATCC wash fastness test, with pattern 4–5 and stain 4–5; commercially acceptable light fastness with break at 20 hours; surprisingly outstanding sublimation fastness, with stain 5 at 455° F.; excellent fastness to oxides of nitrogen with shade change 5 at 2 cycles; and excellent ozone fastness with shade change 5 at 2 cycles.

The portion of the dyeing subjected to permanent press finish had very slight shade change (shade change 4–5).

EXAMPLES C–D

Dispersions of the dyes of Examples 1 and 2 are applied to woven polyethylene terephthalate textile fabric by the conventional long bath carrier method, using emulsified o-phenylphenol carrier. The amounts of dye are varied so that dyeings of 0.1% and 0.4% strength are prepared from each of the two dyes, resulting in light shade and heavy shade dyeings. In this method, the liquor to goods ratio is 30:1, and percent relates to weight of dye (calculated as dye solids) in the dye liquor divided by the weight of the fabric entered into the dye bath. The dyed fabric samples are subjected to tests, and the results are entered in Table I below.

TABLE I

| Test | Example 1 dye | Example 2 dye |
|---|---|---|
| Shade | Brick red | Orange. |
| Light fastness, light shade. | Break at 40 hours | Trace break at 20 hours. |
| Light fastness, heavy shade. | Slight break at 40 hours. | Trace break at 40 hours. |
| Wash fastness, light shade. | Excellent, Pattern 5, Stain 5. | Excellent, Pattern 5, Stain 5. |
| Wash fastness, heavy shade. | Very good, Pattern 5, Stain 4. | Excellent, Pattern 5, Stain 4–5. |
| Sublimation, light shade 30 seconds 400° F. | Excellent, Stain 5 | Excellent, Stain 5 |
| Sublimation, heavy shade 30 seconds 400° F. | ...do... | Excellent, Stain 4–5. |

What is claimed is:

1. A diasazo dye of the formula

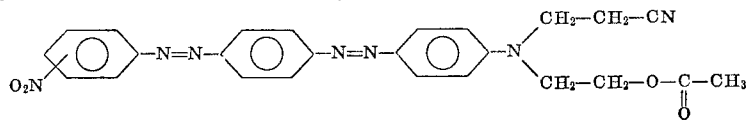

wherein the NO₂ group is located meta or para with respect to the azo group attached to the same phenylene ring as the NO₂ group.

2. A disazo dye as defined in claim 1, wherein said NO₂ group is located meta with respect to the azo group attached to the same phenylene ring as the NO₂ group.

3. A disazo dye as defined in claim 1, and wherein said NO₂ group is located para with respect to the azo group attached to the same phenylene ring as the NO₂ group.

References Cited

UNITED STATES PATENTS

| | | | |
|---|---|---|---|
| 2,216,446 | 10/1940 | McNally et al. | 260—187 X |
| 2,289,413 | 7/1942 | Ellis et al. | 260—187 |
| 2,289,414 | 7/1942 | Ellis et al. | 260—187 X |
| 2,373,700 | 4/1945 | McNally et al. | 260—187 X |
| 3,445,454 | 5/1969 | Fishwick et al. | 260—187 X |

FLOYD D. HIGEL, Primary Examiner

U.S. Cl. X.R.

260—205, 465 D, 465 E